United States Patent
Kang et al.

(10) Patent No.: US 11,430,137 B2
(45) Date of Patent: Aug. 30, 2022

(54) ELECTRONIC DEVICE AND CONTROL METHOD THEREFOR

(71) Applicant: SAMSUNG ELECTRONICS CO., LTD., Suwon-si (KR)

(72) Inventors: Sungho Kang, Suwon-si (KR); Yunjae Lim, Suwon-si (KR); Hyungdal Kwon, Suwon-si (KR); Cheon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/969,026

(22) PCT Filed: Mar. 26, 2019

(86) PCT No.: PCT/KR2019/003513
§ 371 (c)(1),
(2) Date: Aug. 11, 2020

(87) PCT Pub. No.: WO2019/190171
PCT Pub. Date: Oct. 3, 2019

(65) Prior Publication Data
US 2021/0035309 A1    Feb. 4, 2021

(30) Foreign Application Priority Data

Mar. 30, 2018 (KR) .................. 10-2018-0037159

(51) Int. Cl.
*G06K 9/00* (2022.01)
*G06T 7/246* (2017.01)
(Continued)

(52) U.S. Cl.
CPC ............ *G06T 7/248* (2017.01); *G06N 3/084* (2013.01); *G06T 7/254* (2017.01); *G06V 10/751* (2022.01);
(Continued)

(58) Field of Classification Search
CPC ............ G06T 7/11; G06T 2207/10024; G06T 2207/10028; G06T 2207/20081; G06T 2207/30261; G05D 1/0251; G06K 9/00664
(Continued)

(56) References Cited

U.S. PATENT DOCUMENTS 7,970,212 B2   6/2011  Zahavi et al.
9,275,308 B2   3/2016  Szegedy et al.
(Continued)

FOREIGN PATENT DOCUMENTS

JP    2010-136095    6/2010
JP    2017-4350      1/2017
(Continued)

OTHER PUBLICATIONS

Zin, Thi Thi, et al. "Image technology based cow identification system using deep learning." Proceedings of the International MultiConference of Engineers and Computer Scientists. vol. 1. 2018. (Year: 2018).*

(Continued)

*Primary Examiner* — Jonathan S Lee
(74) *Attorney, Agent, or Firm* — Nixon & Vanderhye, P.C.

(57) ABSTRACT

An electronic device and a control method therefor are disclosed. A method for controlling an electronic device according to the present invention comprises the steps of: receiving a current frame; determining a region, within the current frame, where there is a movement, on the basis of a prior frame and the current frame; inputting the current frame into an artificial intelligence learning model on the basis of the region where there is the movement, to obtain information relating to at least one object included in the current frame; and determining the object included in the (Continued)

region where there is the movement, by using the obtained information relating to the at least one object. Therefore, electronic device can rapidly determine an object included in a frame configuring a captured image.

15 Claims, 11 Drawing Sheets

(51) Int. Cl.
*G06T 7/254* (2017.01)
*G06N 3/08* (2006.01)
*G06V 10/75* (2022.01)

(52) U.S. Cl.
CPC .............. *G06T 2207/20081* (2013.01); *G06T 2207/20084* (2013.01); *G06T 2207/20224* (2013.01)

(58) Field of Classification Search
USPC ........................................................ 382/153
See application file for complete search history.

(56) References Cited

U.S. PATENT DOCUMENTS

| | | | |
|---|---|---|---|
| 9,361,534 B2 | 6/2016 | Mizuno et al. | |
| 9,894,348 B2 | 2/2018 | Beon et al. | |
| 10,482,607 B1* | 11/2019 | Walters | G06F 11/3628 |
| 11,074,474 B2* | 7/2021 | Park | G06T 7/254 |
| 2005/0139782 A1 | 6/2005 | Nagahashi et al. | |
| 2019/0180107 A1* | 6/2019 | Pham | G06V 10/507 |
| 2021/0056712 A1* | 2/2021 | Daudelin | G06V 20/56 |

FOREIGN PATENT DOCUMENTS

| | | |
|---|---|---|
| KR | 10-2013-0054637 | 5/2013 |
| KR | 10-1405085 | 6/2014 |
| KR | 10-2016-0070528 | 6/2016 |
| KR | 10-2017-0081887 | 7/2017 |
| KR | 10-2017-0099587 | 9/2017 |
| WO | 2017/078213 | 5/2017 |

OTHER PUBLICATIONS

Baykara, Huseyin Can, et al. "Real-time detection, tracking and classification of multiple moving objects in UAV videos." 2017 IEEE 29th International Conference on Tools with Artificial Intelligence (ICTAI). IEEE, 2017. (Year: 2017).*
Dominguez-Sanchez, Alex, Miguel Cazorla, and Sergio Orts-Escolano. "Pedestrian movement direction recognition using convolutional neural networks." IEEE transactions on intelligent transportation systems 18.12 (2017): 3540-3548. (Year: 2017).*
Wang, Suyu, Peiling Kong, and Mengmeng Wang. "Inter-Frame Differences and Convolution Neural Network based Abnormal Crowd Event Recognition." Proceedings of the 2nd International Conference on Digital Signal Processing. 2018. (Year: 2018).*
International Search Report for PCT/KR2019/003513 dated Jul. 9, 2019, 5 pages with English Translation.
Written Opinion of the ISA for PCT/KR2019/003513 dated Jul. 9, 2019, 12 pages with English Translation.

* cited by examiner

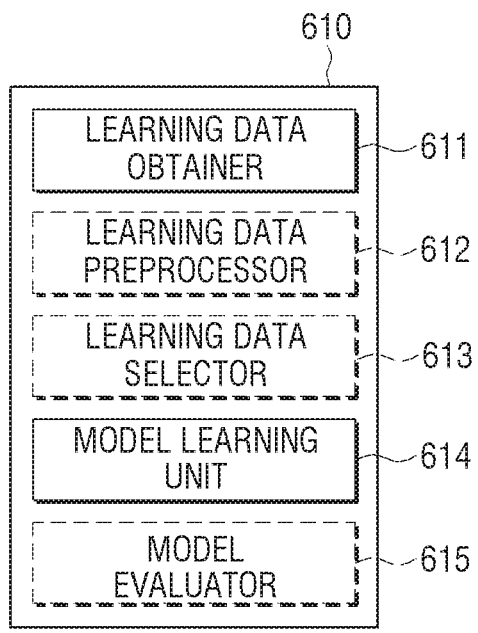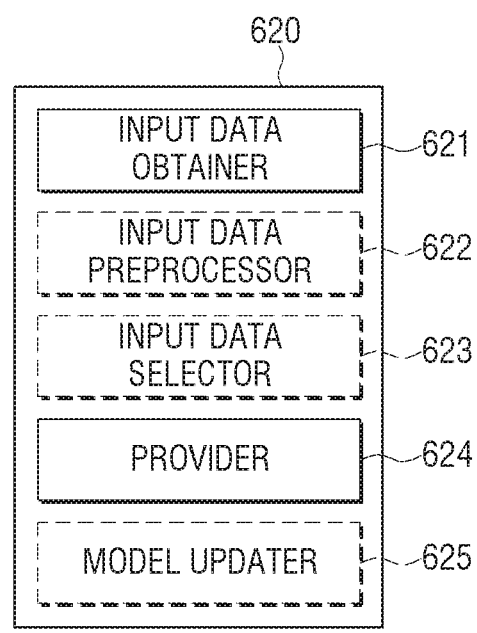
FIG. 7A
FIG. 7B

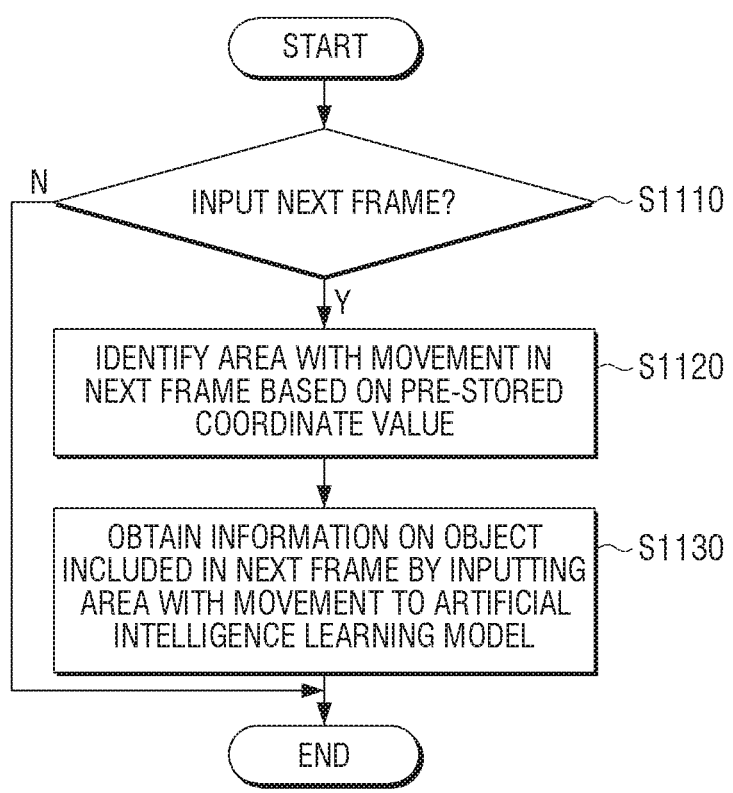

ELECTRONIC DEVICE AND CONTROL METHOD THEREFOR

This application is the U.S. national phase of International Application No. PCT/KR2019/003513 filed Mar. 26, 2019 which designated the U.S. and claims priority to KR Patent Application No. 10-2018-0037159 filed Mar. 30, 2018, the entire contents of each of which are hereby incorporated by reference.

FIELD

The disclosure relates to an electronic device and a control method therefore, and more specifically to an electronic device for identifying an object included in a photographed image and a method for controlling therefor.

DESCRIPTION OF RELATED ART

In recent years, artificial intelligence systems realizing intelligence of a human level are being used in a variety of fields. An artificial intelligence system may be a system in which a machine learns and performs determination on its own thereby becoming smart, unlike existing rule-based smart systems. Because the artificial intelligence system exhibits improved recognition rate and a more accurate understanding of user preference the more it is used, existing rule based smart systems are gradually being replaced with deep learning based artificial intelligence systems.

The artificial intelligence technology includes machine learning (e.g., deep learning) and element technologies utilizing machine learning.

The machine learning may be an algorithm technology that classifies/learns features of input data on its own, and element technology may be technology that simulates functions such as recognition and determination of a human brain by utilizing machine learning algorithms such as deep learning. The artificial intelligence (AI) technology may be applicable to technical fields such as linguistic understanding, visual understanding, inference/prediction, knowledge representation, and motion control.

The various fields to which artificial intelligence technology may be applied is described in the following. Linguistic understanding is a technique in which language/character of humans is recognized and applied/processed and includes natural language processing, machine translation, dialog system, question and answer, speech recognition/synthesis, and the like. Visual understanding is a technique that processes things as recognized visually by a human, and includes object recognition, object tracking, image search, human recognition, scene understanding, space understanding, image enhancement, and the like. Inference prediction is a technique that determines information by logical inference and prediction, and includes knowledge/likelihood based inference, optimization prediction, preference based planning, recommendation and the like. Knowledge representation is a technique that automatically processes experience information of humans to knowledge data and includes knowledge construction (generating/classifying data), knowledge management (utilizing data), and the like. Motion control is a technique for controlling the autonomous driving of a vehicle and the movement of a robot, and includes movement control (navigation, collision, driving), manipulation control (behavior control), and the like.

Recently, developments in technology on vehicles capable of autonomous driving are under progress. Autonomous driving refers to a vehicle being autonomously driven without user manipulation.

In particular, an electronic device equipped within the vehicle may photograph the surroundings of the vehicle, and identify various objects such as buildings around the vehicle, traffic lights, surrounding vehicles, and people by analyzing the photographed image. The electronic device may then control the vehicle to be autonomously driven considering the identified objects.

To achieve a smooth autonomous driving of the vehicle described above, objects in the surrounding of the vehicle require fast identification.

However, if there are movable objects such as the speed in which the vehicle is being autonomously driven and people around the vehicle, surrounding vehicles, and the like present, there have been problems of not being able to more quickly detect objects in the surrounding of the vehicle.

SUMMARY

The disclosure has been devised to solve the above-described problems, and an object of the disclosure is to provide an electronic device for quickly recognizing at least one object included in an image photographed in the electronic device.

Further, an object of the disclosure is to provide a smooth autonomous driving of a vehicle by more quickly recognizing an object included in a photographed image taken through the electronic device.

According to an embodiment, a control method of an electronic device includes receiving a current frame, identifying an area with movement in the current frame based on a previous frame and the current frame, obtaining information on at least one object included in the current frame by inputting the current frame to an artificial intelligence learning model based on the area with movement, and identifying an object included in an area with movement by using the obtained information on the at least one object.

The identifying an area with movement may further include comparing a pixel value of the previous frame and a pixel value of the current frame, and based on the comparison result, identifying an area in which a difference in pixel value exceeds a pre-set threshold value as the area with movement.

The identifying an area with movement may further include storing a coordinate value on an identified area, which is identified as an area with movement.

The obtaining may include inputting the current frame to the artificial intelligence learning model to read an area in which a difference in pixel value is less than or equal to the pre-set threshold value and skip the remaining area.

The obtaining may include, based on a next frame being input, obtaining information on an object included in the next frame by inputting an area with movement in the next frame to the artificial intelligence learning model based on the stored coordinate value.

The identifying the object may include obtaining a feature value on at least one object included in the current frame by inputting the current frame to the artificial intelligence learning model, and identifying the object based on the feature value within the area with movement of the obtained at least one feature value.

The identifying the object may include obtaining the feature value through a convolutional neural network (CNN) algorithm.

The identifying may include identifying an area with movement within the remaining frame excluding an initially input frame from among a plurality of frames being input.

According to an embodiment, an electronic device includes an inputter and a processor configured to identify an area with movement in a current frame based on the current frame and a previous frame input through the inputter, obtain information on at least one object included in the current frame by inputting the current frame to an artificial intelligence learning model based on the area with movement, and identify an object included in the area with movement by using the obtained information on the at least one object.

The processor may identify the area in which a difference in pixel value exceeds a pre-set threshold value as the area with movement.

The electronic device may further include a storage, and the processor may be configured to store a coordinate value on an area identified as the area with movement on the storage.

The processor may be configured to input the current frame to the artificial intelligence learning model to read an area in which a difference in pixel value is less than or equal to the pre-set threshold value, and skip the remaining area.

The processor may, based on a next frame being input through the inputter, obtain information on an object included in the next frame by inputting an area with movement in the next frame to the artificial intelligence learning model based on the stored coordinate value.

The processor may be configured to obtain a feature value on at least one object included in the current frame by inputting the current frame to the artificial intelligence learning model, and identify an object based on a feature value within an area with movement of the obtained at least one feature value.

The artificial intelligence learning model may obtain the feature value through a convolutional neural network (CNN) algorithm.

The processor may identify an area with movement in the remaining frame which excludes the initially input frame of the input plurality of frames.

According to various embodiments described above, the electronic device may identify an area with movement in a frame which comprises a photographed image, and by identifying the object included in the area with the identified movement, the at least one object included in the photographed image may be more quickly recognized.

BRIEF DESCRIPTION OF THE DRAWINGS

FIGS. 7A and 7B are detailed block diagrams of a learning unit and an obtainer according to an embodiment of the disclosure;

FIG. 11 is a flowchart illustrating a method of obtaining information on an object included in an area with movement in a third frame input after a second frame is input in an electronic device according to an embodiment of the disclosure.

DETAILED DESCRIPTION OF EXAMPLE EMBODIMENTS

Figure 1:
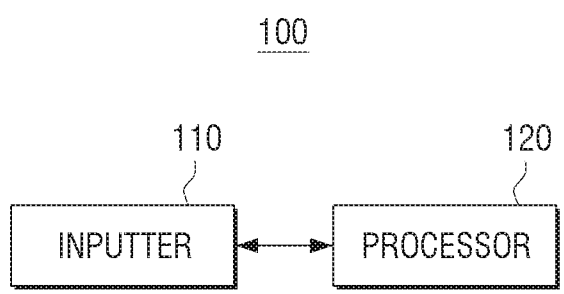
FIG. 1 is a schematic block diagram of an electronic device according to an embodiment of the disclosure.

Various embodiments of the disclosure will be described herein with reference to the accompanying drawings. However, it should be noted that the various embodiments are not for limiting the scope of the disclosure to a specific embodiment, but should be interpreted to include all modifications, equivalents and/or alternatives of the embodiments. In describing the embodiments, like reference numerals may be used to refer to like elements.

In the disclosure, expressions such as "comprise," "may comprise," "consist of," "may consist of," or the like may be used to designate a presence of a corresponding characteristic (e.g., elements such as numerical value, function, operation, or component, etc.), and not to preclude a presence or a possibility of additional characteristics In the disclosure, expressions such as "A or B," "at least one of A and/or B," or "one or more of A and/or B" should be understood to include all possible combinations of the items listed together. For example, "A or B," "at least one of A and B," or "at least one of A or B" should be understood to represent all cases including (1) at least one of A, (2) at least one of B, or (3) at least one of A and at least one of B.

Expressions such as "first" and "second" as used herein may modify various elements, regardless of order and/or importance, and used to distinguish one element from another, without limiting the corresponding elements When a certain element (e.g., first element) is indicated as being "(operatively or communicatively) coupled with/to" or "connected to" another element (e.g., second element), it is to be understood as the certain element being directly coupled with/to the other element or as being coupled through still another element (e.g., third element). On the other hand, when a certain element (e.g., first element) is indicated as "directly coupled with/to" or "connected to" another element (e.g., second element), it is to be understood as still another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may be configured with . . . " together with another device or components. For example, the phrase "a sub-processor configured to (or set up to) perform A, B, and C" may mean a processor dedicated to perform a corresponding operation (e.g., embedded processor), or a generic-purpose processor (e.g., a central processing unit (CPU) or an application processor) capable of performing the corresponding operations by executing one or more software programs stored in the memory device.

The electronic device according to the various embodiments may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), an MP3 player, a medical device, a camera, or a wearable device. A wearable device may include at least one of an accessory type (e.g., a watch, a ring, a bracelet, an anklet, a necklace, a pair of glasses, a contact lens or a head-mounted-device (HMD)), a fabric or a garment-embedded type (e.g., an electronic clothing), a body-attached type (e.g., a skin pad or a tattoo), or a bio-implantable circuit. In some embodiments, the electronic device may include at least one of, for example, a television, a digital video disk (DVD) player, an audio, a refrigerator, a cleaner, an oven, a microwave oven, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™, etc.), an electronic dictionary, an electronic key, a camcorder, or an electronic frame.

In an another embodiment, the electronic device may include at least one of various medical devices (e.g., various portable medical measurement device (e.g., glucose measuring device, a heart rate measuring device, a blood pressure measuring device, a temperature measuring device, etc.), a navigation device, a global navigation satellite system (GNSS), an event data recorder (EDR), a flight data recorder (FDR), a vehicle infotainment device, a nautical electronic equipment (e.g., nautical navigation device, gyro compass, etc.), an avionics electronic device, a security device, a vehicle head unit, an industrial or personal robot, a drone, an automated teller machine (ATM) of financial institutions, a point of sales (POS) of shops, or internet of things device (e.g., light bulbs, various sensors, sprinkler devices, fire alarms, temperature adjusters, street lights, toasters, exercise equipment, hot water tanks, heater, boilers, etc.)).

In the disclosure, the term "user" may refer to a person using an electronic device or a device (e.g., artificial intelligence electronic device) using an electronic device.

FIG. 1 is a schematic block diagram of an electronic device according to an embodiment of the disclosure.

As illustrated in FIG. 1, the electronic device 100 detects an object from an image photographed in real-time, and identifies a position, a type, and the like of the detected object.

According to an embodiment, the electronic device 100 may be equipped within a vehicle capable of autonomous driving and may photograph a surrounding environment of the vehicle in real-time, and detect various objects such as, for example, and without limitation, a person, a building, and the like by analyzing the photographed image. Accordingly, a control device (not shown), which is equipped within the vehicle and performs autonomous driving of a vehicle, may perform the autonomous driving of the vehicle based on the object information detected through the electronic device 100.

The electronic device 100 may include an inputter 110 and a processor 120.

The inputter 110 may receive input of a plurality of frames comprising an image photographed through a camera (not shown).

The processor 120 may identify at least one object included in an area with movement by analyzing a plurality of frames input through the inputter 110.

According to an embodiment, the processor 120 may identify an area with movement from a remaining frame excluding an initially input frame of the plurality of frames input through the inputter 110.

The processor 120 may identify whether a current frame input through the inputter 110 is an initial frame. Upon identification, if the input current frame is an initially input frame (referred to as a start frame), the start frame may be input to the artificial intelligence learning model to read an entire area of the input start frame, and information on all objects included in the start frame through the artificial intelligence learning model may be obtained.

If the input current frame is not the start frame, the processor 120 may, based on the current frame (hereinafter, referred to as a second frame) and a previous frame (hereinafter, referred to as a first frame) input prior to the second frame being input, identify an area with movement of the second frame.

According to an embodiment, the processor 120 may compare a pixel value of the first frame and a pixel value of the second frame, and identify an area in which a difference in pixel value exceeds a pre-set threshold value as an area with movement within the second frame.

Accordingly, if an area with movement within the second frame is identified, the processor 120 may store a coordinate value on an area identified as an area with movement on the storage 130 which will be described below.

The processor 120 may, based on an area with movement within the second frame being identified, obtain information on at least one object included in the second frame by inputting the second frame to the artificial intelligence learning model. The information on the object may include at least one of a feature value for identifying a type of object and a coordinate value to which the object is positioned.

The processor 120 may, based on an area with movement within the second frame being identified, input the second frame to the artificial intelligence learning model to read the area identified as the area with movement within the second frame, and skip the remaining area.

Accordingly, the processor 120 may obtain information on the object included in the area with movement within the second frame through the artificial intelligence learning model.

Based on information on at least one object such as the above being obtained, the processor 120 may identify the object included in the area with movement within the second frame by using the information on the obtained at least one object.

According to an embodiment, the processor 120 may obtain a feature value on the at least one object included in the second frame by inputting the second frame to the artificial intelligence learning model.

The artificial intelligence learning model may obtain the feature value on the at least one object included in the second frame through a pre-defined convolutional neural network (CNN) algorithm.

Accordingly, the artificial intelligence learning model may be stored in the storage 130 to be described below, and a detailed description thereof will be described in greater detail below.

The processor 120 may, based on a feature value on the at least one object included in the second frame being obtained through the artificial intelligence model, identify an object included in an area with movement based on a feature value within the area with movement in the second frame of the obtained at least one feature value.

The processor 120 may, based on a next frame (hereinafter, referred to as a third frame) being input through the inputter 110, obtain information on an object included in an area with movement in the third frame through the embodiment as follows.

According to an embodiment, the processor 120 may, based on the third frame being input through the inputter 110, obtain information on an object included in the third frame by inputting an area with movement in the third frame to the artificial intelligence learning model based on a coordinate value pre-stored in the storage 130.

The processor 120 may, based on the third frame being input through the inputter 110, identify an area with movement in the third frame based on a coordinate value pre-stored in the storage 130.

As described above, the processor 120 may input the third frame to the artificial intelligence learning model to read an area with movement and skip the remaining area.

Accordingly, the processor 120 may obtain information on an object included in the area with movement within the third frame through the artificial intelligence learning model, and identify the object included in the area with movement within the third frame using the obtained information.

According to still another embodiment, the processor 120 may, based on the third frame being input through the inputter 110, compare a pixel value of the second frame input prior to the third frame being input and a pixel value of the third frame and identify an area in which a difference between the pixel values exceeds a pre-set threshold value as an area with movement, as described above.

The processor 120 may input the third frame to the artificial intelligence learning model to read an area identified as the area with movement within the third frame and skip the remaining area.

Accordingly, the processor 120 may, based on information on an object included in the area with movement within the third frame being obtained through the artificial intelligence learning model, identify the object included in the area with movement within the third frame using the obtained information.

The operation of identifying an object included in an area with movement in the second frame input from the processor 120 will be described in greater detail.

Figure 2:
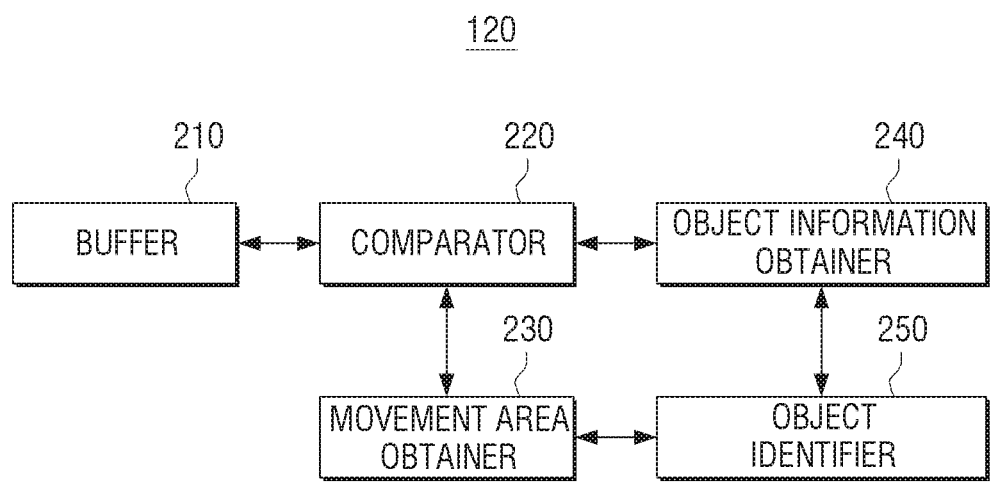
FIG. 2 is a detailed block diagram of a processor according to an embodiment of the disclosure.

FIG. 2 is a detailed block diagram of a processor according to an embodiment of the disclosure.

As illustrated in FIG. 2, the processor 120 may include a buffer 210, a comparator 220, a movement area obtainer 230, an object information obtainer 240, and an object identifier 250.

The buffer 210 may, based on a plurality of frames which comprise an image photographed through the camera being input, temporarily store the plurality of frames in the input order. According to an embodiment, the buffer 210 may be implemented as a volatile memory such as a random access memory (RAM), which will be described below.

The above-described buffer 210 may transfer an initially stored frame of the pre-stored plurality of frames to the object information obtainer 240, which will be described below. The buffer 210 may transfer a frame corresponding to a pre-set condition of the remaining frame excluding the initially stored frame of the pre-stored plurality of frames to the comparator 220.

The comparator 220 may compare the frames transferred from the buffer 210. Specifically, the comparator 220 may receive input of the second frame after the first frame is input through the buffer 210. Based on the first frame and the second frame being input as described above, the comparator 220 may obtain a difference value between a pixel value for each area of the input second frame and a pixel value for each area of the first frame which is the previous frame.

The comparator 220 may compare a difference value between pixel values for each area corresponding to the respective obtained first frame and the second frame, and identify an area exceeding the pre-set threshold value of the plurality of areas comprising the second frame as an area with movement.

The comparator 220 may output information on the area with movement identified in the second frame to the movement area obtainer 230.

The movement area obtainer 230 may obtain a coordinate value on the area with movement identified in the second frame. The movement area obtainer 230 may store the coordinate value on the area with movement within the second frame to the storage, which will be described below.

The comparator 220 may, based on an area with movement in the second frame being identified, generate a result value thereof and output to the object information obtainer 240.

The result value may be a value for reading the area with movement in the second frame and skipping the remaining area.

The object information obtainer 240 may obtain information on at least one object by reading each area comprising a frame input through the buffer 210.

The above-described object information obtainer 240 may, based on a result value on the area with movement in the second frame being input through the comparator 220, obtain information on an object included in the area with movement based on the input result value.

Specifically, the object information obtainer 240 may, based on the result value on the area with movement in the second frame being input through the comparator 220, input the input result value to the artificial intelligence learning model.

Accordingly, the artificial intelligence learning model may perform calculation by reading only the area with movement in the second frame based on the input result value, and the object information obtainer 240 may output information on the object included within the area with movement in the second frame based on the calculation result performed through the artificial intelligence learning model.

The object identifier 250 may identify at least one object included within a frame based on information output from the object information obtainer 240.

The object identifier 250 may, based on information on an object included in an area with movement in the second frame being input from the object information obtainer 240, identify the object included in the area with movement in the second frame by using information on the input object and the coordinate value on the area with movement in the second frame pre-stored in the storage 130.

Figure 3:
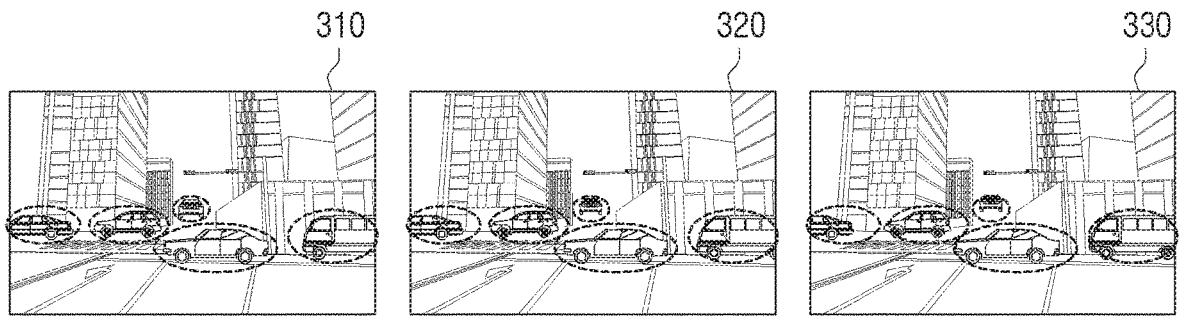
FIG. 3 is an exemplary view illustrating a processor identifying a movement area within an input frame according to an embodiment of the disclosure.

FIG. 3 is an exemplary view illustrating a processor identifying a movement area within an input frame according to an embodiment of the disclosure, and FIG. 4 is an exemplary view illustrating a processor obtaining information of an object included within a movement area according to an embodiment of the disclosure.

As illustrated in FIG. 3, the processor 120 may, based on an Nth frame 320 of the plurality of frames comprising an image being input, compare the input Nth frame 320 and the previously input N−1st frame 310 and identify an area in which movement occurred in the Nth frame 320.

The processor 120 may identify an area in which movement occurred in the Nth frame 320 input through the above-described comparator 220.

The comparator 220 may, based on the Nth frame 320 of the plurality of frames temporarily stored in the buffer 210 being input, compare a pixel value of the previously input N−1st frame 310 and a pixel value of the currently input Nth frame 320 and identify the area in which the difference between the two pixel values exceeds the pre-set threshold value as the area with movement in the Nth frame 320.

The comparator 220 may, based on an N+1st frame 330 being input, compare a pixel value of the previously input Nth frame 320 and a pixel value of a currently input N+1st frame 330 and identify an area in which the difference between the two pixel values exceeds the pre-set threshold value as the area with movement in the N+1st frame 330.

As illustrated above, the N−1, N, N+1 frames 310 to 330 may include various objects such as buildings, vehicles, and signal lights. The area in which an object related to a moving vehicle of the plurality of objects included in each of the N−1, N, N+1 frames 310 to 330 as describe above may be different from one another.

Accordingly, the comparator 220 may identify the area in which the object related to the vehicle is positioned within the currently input frame as the area in which movement is generated through a comparison between the currently input frame and the previously input frame.

The comparator 220 may, based on an area with movement within the currently input frame being identified, convert to a value for reading only the area with the corresponding movement and skipping the remaining area in the artificial intelligence learning model, and transfer the converted result value to the object information obtainer 240.

The object information obtainer 240 may, based on a result value on an area identified as the area with movement within the currently input frame being input from the comparator 220, input the input result value to the artificial intelligence learning model.

Figures 4A, 4B:
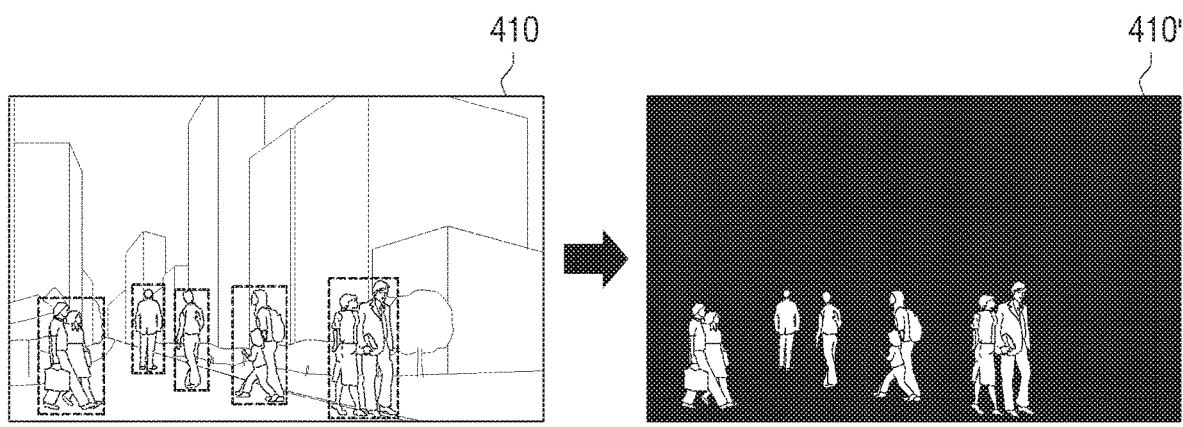
FIGS. 4A and 4B are exemplary views illustrating a processor obtaining information of an object included within a movement area according to an embodiment of the disclosure.

The artificial intelligence learning model may perform calculation by reading only the area with movement in the currently input frame based on the input result value. Accordingly, the object information obtainer 240 may output information on the object included within the area with the corresponding movement based on the calculation result performed through the artificial intelligence learning model As illustrated in FIG. 4A, the boxed area within the input frame 410 may be the area with movement. Accordingly, the object information obtainer 240 may, based on the result value on the area with movement in the corresponding frame 410 being input through the comparator 220, input the input result value to the artificial intelligence learning model.

Accordingly, the artificial intelligence learning model may perform calculation by reading the area with movement based on the input result value, and not performing calculation by skipping the remaining area.

Based on a calculation result on an area with movement within a frame 410 input through the artificial intelligence learning model being output, the object information obtainer 240 may obtain information on an object included in an area with movement within a frame 410' based on the output calculation result, as illustrated in FIG. 4B.

In the above, the operation of identifying an object from an image photographed in the electronic device 100 according to an embodiment has been described in detail. The detailed configuration of the electronic device 100 according to an embodiment will be described below in greater detail.

Figure 5:
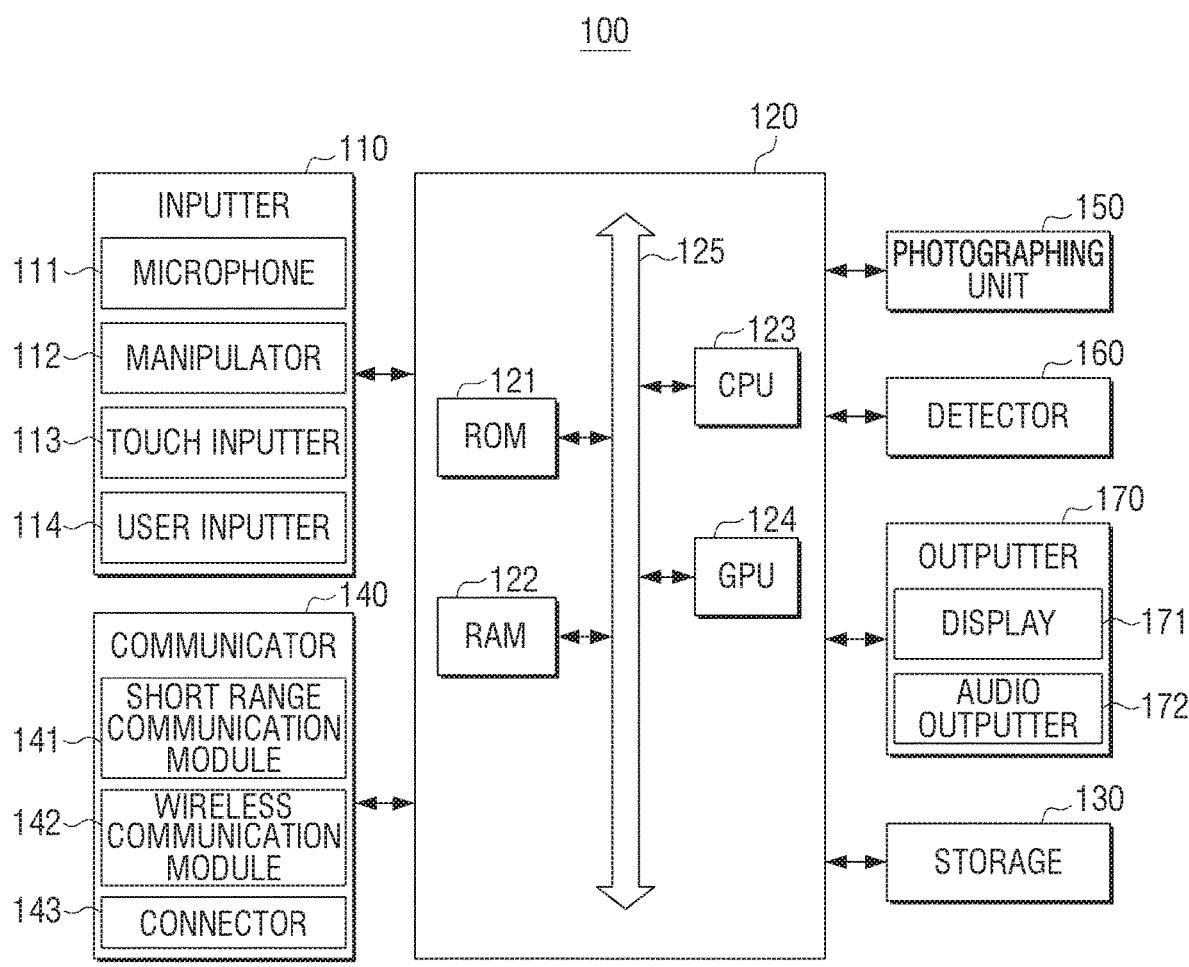
FIG. 5 is a detailed block diagram of an electronic device according to an embodiment of the disclosure.

FIG. 5 is a detailed block diagram of an electronic device according to an embodiment of the disclosure.

As described above, the inputter 110 may not only receive input of a plurality of frames comprising the photographed image, but also receive input of various user commands and transfer the received commands to the processor 120.

The inputter 110 may include a microphone 111, a manipulator 112, a touch inputter 113, and a user inputter 114.

The microphone 111 may receive input of a speech command of a user, and the manipulator 112 may be implemented as a key pad including various function keys, number keys, special keys, character keys, and the like.

The touch inputter 113 may, based on a display 171 to be described below being implemented to a touch screen form, be implemented as a touch pad forming an inter-layered structure with the display 171. The touch inputter 113 may receive a selection command on an icon related to various applications displayed through the display 171.

The user inputter 114 may receive input of an infrared (IR) signal or radio frequency (RF) signal for controlling an operation of the electronic device 100 from at least one of a periphery device (not shown) such as a remote control device.

The electronic device 100 may, in addition to the above-described inputter 110 and processor 120 configurations, further include a storage 130, a communicator 140, a photographing unit 150, a detector 160, and an outputter 170, as described in FIG. 5.

As described above, the storage 130 may store the artificial intelligence learning model for obtaining information on at least one object included in the plurality of frames comprising the photographed image.

In addition to the above, the storage 130 may further store an operating program for controlling an operation of the electronic device 100.

The operating program may be a program capable of operating each configuration of the electronic device 100 by being read and compiled in the storage 130 when the electronic device 100 is turned-on. The above-described storage 130 may be implemented as at least one of a read only memory (ROM) 121 to be described below, a RAM 122, a memory card (e.g., a secure digital (SD) card, a memory stick) capable of attaching/detaching to the electronic device 100, a non-volatile memory, a volatile memory, a hard disk drive (HDD), and a solid state drive (SSD).

The communicator 140 may perform data communication with a periphery device (not shown) such as a smart television (TV), a smartphone, and a tablet PC, and a relay terminal device (not shown) for transmitting and receiving data with a content server (not shown). The communicator 140 may, based on the above-described artificial intelligence model being stored in a separate artificial intelligence server (not shown), transmit data on a plurality of frames comprising the photographed image to the artificial intelligence server (not shown) and may receive information on the at least one object included in the plurality of frames from the artificial intelligence server (not shown).

The above-described communicator 140 may include a connector 143, which includes at least one of a wireless communication module 142 such as a short range communication module 141 and a wireless local area network (LAN), and a wired communication module such as a high-definition multimedia interface (HDMI), a universal serial bus (USB), and an Institute of Electrical and Electronics Engineers (IEEE) 1394.

The short range communication module 141 may be a configuration which performs short range communication wirelessly with a periphery device, an artificial intelligence server, and the like located within close distance with the electronic device 100. The above-described short range communication model 141 may include at least one of a Bluetooth module, an infrared data association (IrDA) module, a near field communication module (NFC), a Wi-Fi module, and a ZigBee module.

In addition, the wireless communication module 142 may be a module which performs communication by being connected to an external network according to a wireless communication protocol such as IEEE. In addition to the above, the wireless communication module may further include a mobile communication module, which performs communication by connecting to a mobile communication network according to various mobile communication standards such as 3rd generation (3G), 3rd generation partnership project (3GPP), and long term evolution (LTE).

As described above, the communicator 140 may be implemented to the various above-described short range communication methods, and if necessary, other communication technologies not mentioned herein may be employed.

The connector 143 may be a configuration which provides an interface with various source devices such as USB 2.0, USB 3.0, HDMI, and IEEE 1394. The above-described connector 143 may, based on a control instruction of the processor 120, receive content data transmitted from an external server (not shown) through a wired cable connected to the connector 143, or transmit the pre-stored content data to an external recording medium. In addition, the connector 143 may receive power from a power source through the wired cable, which is physically connected to the connector 143.

The photographing unit 150 may photograph an image through the camera. The photographed image may be a moving image or a still image. The above-described photographing unit 150 may transfer a plurality of frames comprising the photographed image to the processor 120 or may transfer to the processor 120 through the inputter 110.

The detector 160 may detect a motion of the electronic device 100. The above-described detector 160 may include an accelerometer sensor, a magnetic sensor, a gyroscope sensor, and the like, and may detect motion of the electronic device 100 by using the various sensors such as the above.

The accelerometer sensor, as a sensor for measuring an acceleration speed or a strength of impact of a moving electronic device 100, may be an essential sensor used not only in electronic devices such as a smartphone and a tablet PC, but also in a control system of various transport means such as an automobile, a train, and an airplane, and in robots, and the like.

The magnetic sensor, as an electronic compass capable of detecting azimuth by using the earth magnetic field, may be used in positional tracking, a three dimensional (3D) image game, and the like, or may be a sensor used in smartphones, a radio, a global positioning system (GPS), a personal digital assistant (PDA), a navigation device, and the like.

The gyroscope sensor may be a sensor which senses the direction of six axes by adding rotation to each of the existing accelerometer sensors and assists in the recognition of a more detailed and precise operation.

The outputter 170 may output various content including an image photographed through the photographing unit 150. The above-described outputter 170 may include a display 171 for outputting an image data of a content and an audio outputter 172 for outputting an audio data of the corresponding content.

The display 171 for outputting an image data of a content may provide information on an object included within the photographed image based on a result value output through the artificial intelligence learning model. The above-described display 171 may display an execution screen including an icon for executing each of a plurality of icons stored in the storage 130 or display various user interface (UI) screens for controlling an operation of the electronic device 100.

The above-described display 171 may be implemented as a liquid crystal display (LCD), an organic light emitting display (OLED), and the like.

As described above, the display 171 may be implemented to a touch screen form forming an inter-layered structure with the touch inputter 113 which receives user touch command.

The audio outputter 172 may output information on an object included within the photographed image to an audio form based on the result value output through the artificial intelligence learning model. In addition to the above, the audio outputter 172 may output an audio data included in the content requested by a user or various notification sounds or voice messages.

The above-described processor 120 may control the overall operation of the electronic device 100, or may be a processing device so that the overall operation of the electronic device 100 may be controlled.

The processor 120 may include a CPU 123, a ROM 121, a RAM 122 and a graphics processing unit (GPU) 124, and the CPU 123, the ROM 121, the RAM 122 and the GPU 124 may be inter-connected through a bus 125.

The CPU 123 may access the storage 130, and perform booting by using an operating system (OS) stored in the storage 130. Further, the CPU 123 may perform various operations by using various programs, content, data, and the like stored in the storage 130.

The GPU 124 may generate a display screen including a variety of objects such as an icon, an image, and a text. Specifically, the GPU 124 may calculate an attribute value such as a coordinate value, a shape, a size, a color, and the like of each of the objects to be displayed according to a layout of the screen based on the received control instruction, and generate display screens of various layouts including the object based on the calculated attribute value.

The ROM 121 may be stored with an instruction set, and the like for booting the system. Based on power being supplied with the input of a turn-on instruction, the CPU 123 may copy the OS stored in the storage 130 to the RAM 122 according to the instruction stored in the ROM 121 and perform booting of the system by executing the OS. When booting is completed, the CPU 123 may copy the various programs stored in the storage 130 to the RAM 122, and perform various operations by executing a program copied to the RAM 122.

The processor 120 may be combined with each of the above-described configurations and be implemented as a system-on-a-chip (SOC) or a system on chip (SoC).

The operation for updating the artificial intelligence learning model and using the artificial intelligence learning model in the processor 120 according to an embodiment will be described in greater detail below.

Figure 6:
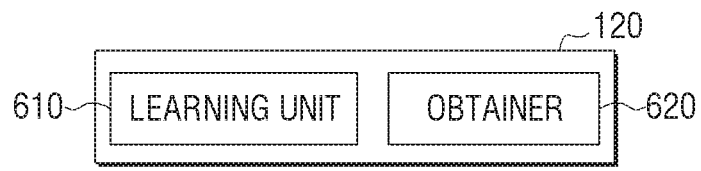
FIG. 6 is a detailed block diagram of a processor of an electronic device which updates and uses an artificial intelligence learning model according to an embodiment of the disclosure.

FIG. 6 is a detailed block diagram of a processor of an electronic device which updates and uses an artificial intelligence learning model according to an embodiment of the disclosure.

As illustrated in FIG. 6, the processor 120 may further include a learning unit 610 and an obtainer 620.

As illustrated in FIG. 6, the processor 120 may include at least one of the learning unit 610 and the obtainer 620. The processor 120 of FIG. 6 may correspond with the processor 120 of the electronic device of FIGS. 1 and 5, or a processor of a data learning server (not shown).

The learning unit 610 may use learning data to generate or train a model (hereinafter, referred to as a first model) for recognizing a plurality of objects included in an image photographed through the electronic device 100.

In addition to the above, the learning unit 610 may generate or train a model (hereinafter, referred to as a second model) for obtaining a keyword on a user speech. The above-described learning unit 610 may use the collected learning data to generate a learning model with a recognition criteria.

In an embodiment, the learning unit 610 may generate, train or update the first model for obtaining information on a plurality of objects included in the corresponding frame by using the plurality of frames comprising the image photographed through the electronic device 100 as input data.

In addition, the learning unit 610 may generate, train or update the second model for obtaining a keyword corresponding to the user speech by using information on the plurality of objects, user information, and user speech as input data.

According to another embodiment, the first model and the second model may be implemented as an integrated model with each other. That is, the integrated model may use input data on a photographed image and user speech as input data and obtain a keyword corresponding to the user speech.

The obtainer 620 may use a predetermined data as input data of a trained model, and obtain various information.

In an example, the obtainer 620 may use the plurality of frames comprising the photographed image as input data of the trained first model, and obtain (or, recognize, estimate) information on the plurality of objects included in the plurality of frames comprising the corresponding image.

In addition, the obtainer 620 may use information on the plurality of objects, user information, and user speech as input data of the trained second model to obtain (or, estimate, infer, recognize) a keyword corresponding to the user speech of the plurality of objects.

At least a part of the learning unit 610 and at least a part of the obtainer 620 may be equipped on the electronic device by being implemented as a software module or produced in at least one hardware chip form. For example, at least one of the learning unit 610 and the obtainer 620 may be manufactured to a hardware chip form dedicated for artificial intelligence (AI), or equipped to the various electronic devices described above by being manufactured as a part of an existing generic-purpose processor (e.g., CPU or an application processor) or a part of a graphics dedicated processor (e.g., GPU). The hardware chip dedicated for artificial intelligence, as a dedicated processor specializing in probability calculation, may quickly process calculation operations of the artificial intelligence field such as machine learning due to a high parallel processing performance compared with the existing generic-purpose processor.

If the learning unit 610 and the obtainer 620 are implemented as a software module (or, a program module including an instruction), the software module may be stored in a non-transitory computer readable media. The software module may be provided by the OS or by a predetermined application. Alternatively, a part of the software module may be provided by the OS, and the remaining part may be provided by the predetermined application.

The learning unit 610 and the obtainer 620 may be equipped on one electronic device, or may be equipped on separate electronic devices, respectively. For example, at least one of the learning unit 610 and the obtainer 620 may be included in the electronic device 100, and the remaining one may be included in an external server (not shown). In addition, the learning unit 610 and the obtainer 620 may communicate with each other by a wired or wireless communication method, accordingly a model information built by the learning unit 610 may be sent to the obtainer 620 and data input to the learning unit 610 may be sent to the learning unit 610 as additional learning data.

FIG. 7 is a detailed block diagram of a learning unit and an obtainer according to an embodiment of the disclosure.

As illustrated in FIG. 7A, the learning unit 610 may include a learning data obtainer 611 and a model learning unit 614. In addition, the learning unit 610 may selectively further include at least one of a learning data preprocessor 612, a learning data selector 613, and a model evaluator 615.

The learning data obtainer 611 may obtain learning data necessary to the first model and the second model. According to an embodiment, the learning data obtainer 611 may obtain image data, information on a plurality of objects, user information, user speech, and the like as learning data. The learning data may be data, which is collected or tested by the learning unit 610 or a manufacturer of a learning unit 610.

The model learning unit 614 may be trained to have a criteria on how to recognize an object included in the plurality of frames comprising the image by using the learning data. For example, the model learning unit 614 may train the artificial intelligence learning model through supervised learning, which uses at least some of the learning data as an identification criteria. Alternatively, the model learning unit 614 may train the artificial intelligence model through unsupervised learning which discovers an identification criteria for identifying circumstance by self-learning using the learning data without particular supervision.

In addition, the model learning unit 614 may, for example, train the artificial intelligence learning model through reinforcement learning, which uses feedback on whether a result of the identifying the circumstance according to training is correct. In addition, the model learning unit 614 may, for example, train the artificial intelligence learning model by using a learning algorithm including an error back-propagation or a gradient descent.

The model learning unit 614 may, based on a pre-built artificial intelligence model being present in plurality, may identify the input learning data and the artificial intelligence learning model with the most relevance in basic learning data as an artificial intelligence learning model to be learned. The basic learning data may be pre-classified by type of data, and the artificial intelligence model may be pre-built by type of data.

For example, the basic learning data may be pre-classified to various criteria such as such as an area in which the learning data is generated, a time at which the learning data is generated, a size of the learning data, a genre of the learning data, a generator of the learning data, and a type of object within the learning data.

When the artificial intelligence learning model is trained, the model learning unit 614 may store the trained artificial intelligence learning model. The model learning unit 614 may store the trained artificial intelligence learning model on the storage 130 of the electronic device 100. Alternatively, the model learning unit 614 may also store the trained artificial intelligence learning model on a memory of a server (e.g., artificial intelligence server 250) connected with the electronic device 100 through a wired or wireless network.

The learning unit 610 may improve a recognition result of the artificial intelligence learning model, or further include a learning data preprocessor 612 and a learning data selector 613 to save resources or time required in generating the artificial intelligence learning model.

The learning data preprocessor 612 may preprocess the obtained data for the obtained data to be used in the obtaining of information on the object and training for generating a keyword. The learning data preprocessor 612 may process the corresponding data to a pre-set format for the model learning unit 614 to use the obtained data to obtain information on the object.

The learning data selector 613 may select data required in the learning of the data obtained in the learning data obtainer 611 or the data preprocessed in the learning data preprocessor 612. The selected learning data may be provided to the model learning unit 614.

The learning data selector 613 may select learning data necessary in the learning of the data which is obtained or preprocessed based on a pre-set selection criteria. In addition, the learning data selector 613 may select a learning data according to the selection criteria pre-set by the learning of the model learning unit 614.

The learning unit 610 may further include a model evaluator 615 to improve recognition result of the artificial intelligence learning model.

The model evaluator 615 may input an evaluation data to the artificial intelligence learning model, and based on the recognition data output from the evaluation data not satisfying a predetermined criteria, the model learning unit 614 may be made to learn again. The evaluation data may be a pre-defined data for evaluating the artificial intelligence model.

For example, the model evaluator 615 may, from the recognition result of the trained artificial intelligence learning model on the evaluation data, evaluate as not satisfying a predetermined criteria if the number or ratio of evaluation data in which recognition result is inaccurate exceeds a pre-set threshold value.

Based on the trained artificial intelligence learning model being present in plurality, the model evaluator 615 may evaluate whether a predetermined criteria is being satisfied with respect to the each of the trained artificial intelligence learning model, and identify the model satisfying the pre-determined criteria as the final artificial intelligence learning model. If the trained model satisfying the predetermined criteria is in plurality, the model evaluator 615 may identify any one or a predetermined number of learning models previously set in the order of the highest evaluation scores as the final artificial intelligence learning model.

The obtainer 620 may, as illustrated in FIG. 7B, include an input data obtainer 621 and a provider 624.

The obtainer 620 may selectively further include at least one of an input data preprocessor 622, an input data selector 623, and a model updater 625.

The input data obtainer 621 may obtain data required for obtaining information on the object included in the plurality of frames comprising the image.

The provider 624 may obtain information on the object included in the plurality of frames comprising the image by applying the input data obtained from the input data obtainer 621 to the trained artificial intelligence learning model as an input value.

The above-described provider 624 may obtain a recognition result by applying data selected by the input data preprocessor 622 to be described below or the input data selector 623 to the artificial intelligence learning model as the input value. The recognition result may be identified by the artificial intelligence learning model.

In an embodiment, the provider 624 may obtain (or, estimate) information on the object included in the plurality of frames comprising the image by applying the data related to the image obtained in the input data obtainer 621 to the trained first model.

In an another example, the provider 624 may obtain (or, estimate) a keyword on the object corresponding to a user speech by applying the information on the object obtained in the input data obtainer 621, the user information, the user speech, and the like to the trained second model.

The obtainer 620 may further include the input data preprocessor 622 and the input data selector 623 to improve the recognition result of the artificial intelligence learning model or to save resources or time for providing the recognition result.

The input data preprocessor 622 may preprocess the obtained data for the data obtained to be input to the first and second models to be used. The input data preprocessor 622 may process the obtained data in a pre-defined format for the provider 624 to use the obtained data to obtain information on the object and generate a keyword.

The input data selector 623 may select data required in the identifying the circumstance of the data obtained in the input data obtainer 621 or the data preprocessed in the input data preprocessor 622. The selected data may be provided to the provider 624. The input data selector 623 may, based on the pre-set selection criteria for identifying the circumstance, select a portion or all of the data which was obtained or preprocessed. In addition, the input data selector 623 may also select data according to the selection criteria pre-set by the learning of the model learning unit 614.

The model updater 625 may, based on an evaluation on the recognition result provided by the provider 624, control the artificial intelligence model to be updated.

For example, the model updater 625 may, by providing the recognition result provided by the provider 624 to the model learning unit 614, request the model learning unit 614 to additionally train or update the artificial intelligence learning model.

Figure 8:
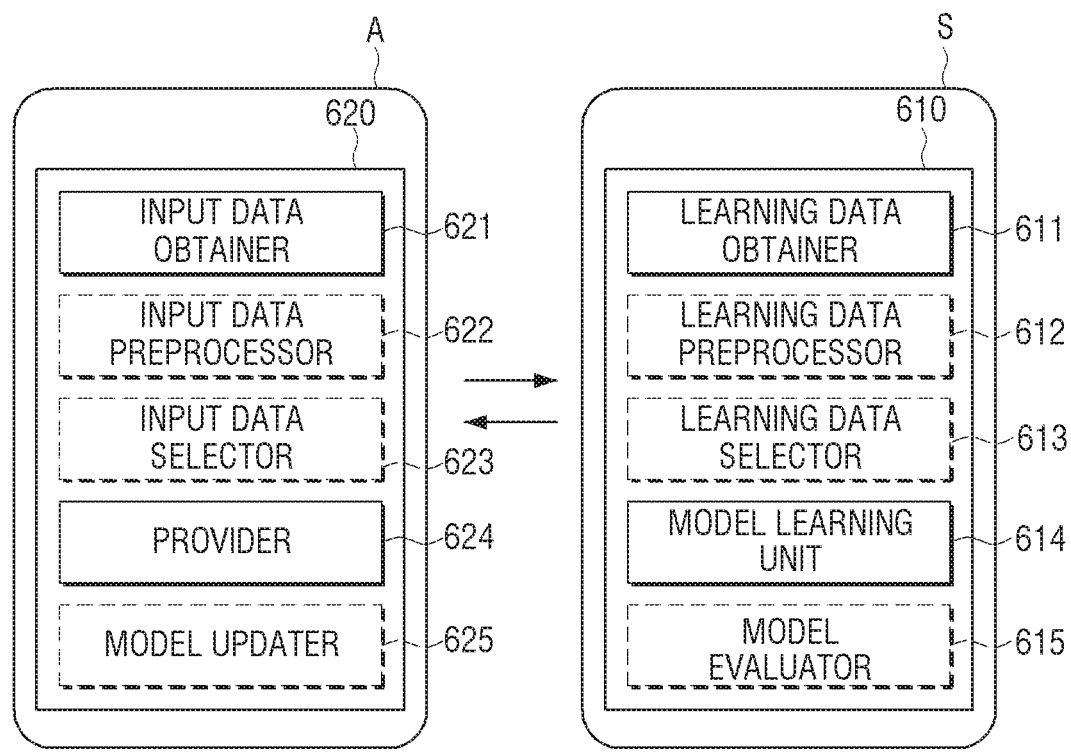
FIG. 8 is an exemplary view of an electronic device and an external server learning and identifying data by operating in association with each other according to an embodiment of the disclosure.

FIG. 8 is an exemplary view of an electronic device and an external server learning and identifying data by operating in association with each other according to an embodiment of the disclosure.

As illustrated in FIG. 8, the external server S may obtain information on the plurality of objects included in the plurality of frames comprising the image. Additionally, the external server S may also learn a criteria for obtaining a keyword on the object corresponding to user speech.

The electronic device A may not only obtain information on the plurality of objects included in the plurality of frames comprising the image by using models generated based on the learning result by server S, but also obtain the keyword on the object corresponding to the user speech.

The model learning unit 614 of the server S may perform a function of the learning unit 610 illustrated in FIG. 6. The model learning unit 614 of the server S may learn an identification criteria (or, recognition criteria) on the first and second models.

In addition, the provider 624 of the electronic device A may not only obtain information on the object included in the plurality of frames comprising the image by applying the data selected by the input data selector 623 to the artificial intelligence learning model generated by the server S, but also obtain a keyword on the object corresponding to the user speech.

In addition, the provider 624 of the electronic device A may receive the artificial intelligence learning model generated by the server S from the server S, and may not only obtain information on the object included in the plurality of frames comprising the image by using the received artificial intelligence learning model, but also obtain the keyword on the object corresponding to the user speech.

In the above, the operation for identifying the object included in the plurality of frames comprising the image by using the artificial intelligence learning model in the electronic device 100 according to the disclosure has been described in detail.

In the following, a method of identifying an object included in a plurality of frames by inputting the plurality of frames comprising the input image to the artificial intelligence learning model in the electronic device 100 of the disclosure will be described in greater detail.

Figure 9:
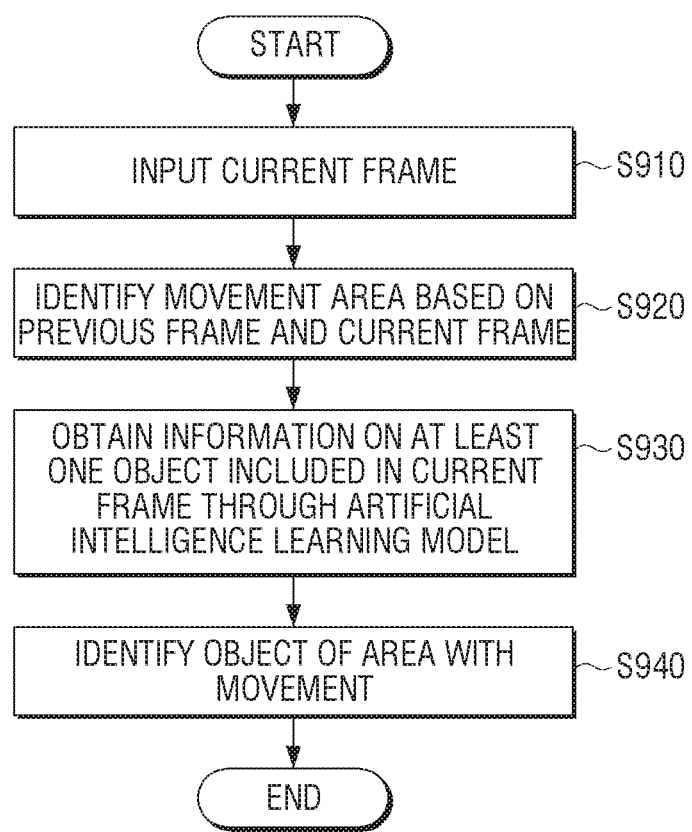
FIG. 9 is a flowchart illustrating a method of identifying an object from an image input by an electronic device according to an embodiment of the disclosure.

FIG. 9 is a flowchart illustrating a method of identifying an object from an input input in an electronic device according to an embodiment of the disclosure.

As illustrated in FIG. 9, the electronic device 100 may, based on a frame comprising the photographed image being input, identify an area with movement of the second frame based on the input current frame (hereinafter, referred to as a second frame) and a previously input previous frame (hereinafter, referred to as a first frame) S910 and S920.

The electronic device 100 may input the second frame to the artificial intelligence learning model based on the area with movement identified in the second frame, and obtain information on the at least one object included in the second frame based on a result value output through the artificial intelligence learning model S930.

The electronic device 100 may identify an object included in the area with movement in the second frame by using the information on the obtained at least one object S940.

The electronic device 100 may, based on a frame on the photographed image being input, identify whether the input frame is an initially input frame (hereinafter, referred to as a start frame). Upon identification, based on the input frame being the start frame, the electronic device 100 may input the start frame to the artificial intelligence learning model to read the entire area of the input start frame. The electronic device 100 may obtain information on the at least one object included in the start frame based on a result value output through the artificial intelligence learning model.

Based on the input frame not being the start frame, the electronic device 100 may identify an area with movement of the second frame based on the input second frame and the first frame input prior to the second frame being input.

The method of identifying an area with movement based on the input frame in the electronic device 100 will be described in greater detail below.

Figure 10:
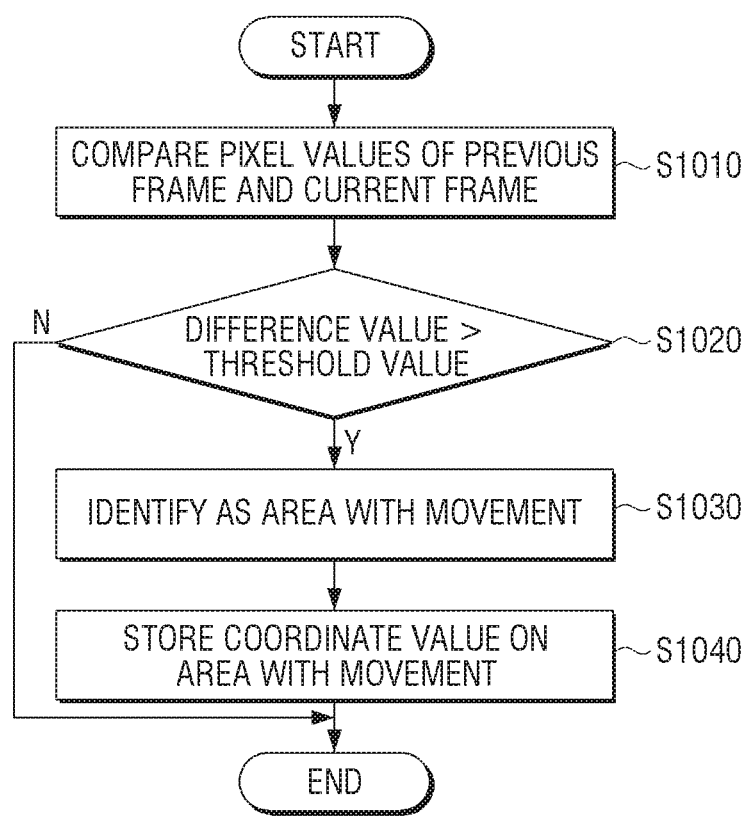
FIG. 10 is a flowchart illustrating a method of identifying an area with movement in an input frame in an electronic device according to an embodiment of the disclosure.

FIG. 10 is a flowchart illustrating a method of identifying an area with movement in an input frame in an electronic device according to an embodiment of the disclosure.

As illustrated in FIG. 10, the electronic device 100 may, based on the second frame being input, compare the pixel value of the first frame input prior to the second frame being input and the pixel value of the currently input second frame S1010.

The electronic device 100 may identify whether a difference between the pixel values of the first and second frames exceeds the pre-set threshold value, and identify the area in which the difference between pixel values exceeds the pre-set threshold value as the area with movement within the second frame S1020 and S1030.

The electronic device 100 may store a coordinate value on an area identified as the area with movement in the second frame S1040.

Based on an area with movement being identified in the second frame which is input through the above-described embodiment, the electronic device 100 may input the second frame to the artificial intelligence learning model to read an area identified as the area with movement within the second frame, and skip the remaining area.

Accordingly, the electronic device 100 may obtain information on the object included in the area with movement within the second frame through the artificial intelligence learning model.

Based on information on at least one object as described above being obtained, the electronic device 100 may identify the object included in the area with movement within the second frame by using the information on the obtained at least one object.

The electronic device 100 may, based on an area with movement being identified in the second frame, generate a result value thereof. The result value may be a value for reading an area with movement in the second frame and skilling the remaining area.

Based on the result value as described above being generated, the electronic device 100 may input the result value on the area with movement in the second frame to the artificial intelligence learning model.

The artificial intelligence learning model may perform calculation by reading only the area with movement in the second frame based on the input result value. Accordingly, the electronic device 100 may obtain information on the at least one object included in the second frame based on the calculation result performed through the artificial intelligence learning model.

The calculation result, which is performed through the artificial intelligence learning model, may be a feature value on the object, and the artificial intelligence learning model may obtain the feature value on the object included in the area with movement in the second frame through a pre-defined convolutional neural network (CNN) algorithm.

Accordingly, the electronic device 100 may obtain information on the object included in the area with movement in the second frame based on the feature value output through the artificial intelligence learning model.

Based on information being obtained in the area with movement in the second frame, the electronic device 100 may identify the object included in the area with movement in the second frame by using information on the area with movement in the second frame and the pre-stored coordinate value with respect to the corresponding area.

The electronic device 100 may, based on a next frame (hereinafter, referred to as a third frame) being input after the second frame is input, obtain information on the object included in the area with movement in the third frame through the process described below.

FIG. 11 is a flowchart illustrating a method of obtaining information on an object included in an area with movement in a third frame input after a second frame is input in an electronic device according to an embodiment of the disclosure.

As illustrated in FIG. 11, the electronic device 100 may identify whether the third frame is input after the second frame is input S1110. Upon identification, when the third frame is input, the electronic device 100 may identify an area with movement in the third frame based on the pre-stored coordinate value S1120.

As described above, the electronic device 100 may input the third frame to the artificial intelligence learning model to read the area with movement and skip the remaining area, and obtain information on the object included in the area with movement in the third frame based on the result value output through the artificial intelligence learning model S1130.

Based on information on the object included in the area with movement in the third frame being obtained, the electronic device 100 may identify the object included in the area with movement in the third frame through operation S940 of FIG. 9 described above.

However, the disclosure is not limited thereto, and the electronic device 100 may, based on the third frame being input, compare the pixel value of the second frame input prior to the third frame being input and the pixel value of the currently input third frame and identify the area in which the difference between the pixel values exceeds the pre-set threshold value as the area with movement, as described above.

Based on the area with movement in the third frame being identified based on the difference between the pixel values of the second and third frames, the electronic device 100 may input the third frame to the artificial intelligence learning model to read an area identified as the area with movement in the third frame and skip the remaining area.

Accordingly, the electronic device 100 may obtain information on the object included in the area with movement within the third frame through the artificial intelligence learning model, and identify the object included in the area with movement within the third frame by using the obtained information.

The control method of the electronic device 100 as describe above may be implemented as at least one execution program, and the execution program may be stored in a non-transitory computer readable medium.

The non-transitory computer readable medium may refer to a medium that stores data semi-permanently rather than storing data for a very short time, such as a register, a cache, a memory or etc., and is readable by a device. In detail, the aforementioned programs may be stored in a recordable medium of various types readable in a terminal, such as, for example, and without limitation, a RAM, a flash memory, a ROM, an erasable programmable ROM (EPROM), an electronically erasable and programmable ROM (EEPROM), a register, a hard disc, a removable disc, a memory card, a USB memory, a compact disc ROM (CD-ROM), and the like.

In the above, the disclosure has been described focusing on the example embodiments thereof.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure, including the appended claims and their equivalents.

What is claimed is:

1. A control method of an electronic device, the method comprising:
    receiving a current frame;
    identifying an area with movement in the current frame based on a previous frame and the current frame;
    obtaining information on at least one object comprised in the current frame by inputting the current frame to an artificial intelligence model based on the area with movement; and
    identifying an object comprised in the area with movement by using the obtained information on the at least one object.

2. The method of claim 1, wherein the identifying the area with movement further comprises:
    comparing a pixel value of the previous frame and a pixel value of the current frame; and
    based on the comparison, identifying an area in which a difference in pixel value exceeds a pre-set threshold value as the area with movement.

3. The method of claim 2, wherein the identifying the area with movement further comprises:
    storing a coordinate value on an area identified as the area with movement.

4. The method of claim 3, wherein the obtaining comprises, based on a next frame being input, obtaining information on an object comprised in the next frame by inputting an area with movement in the next frame to the artificial intelligence learning model based on the stored coordinate value.

5. The method of claim 2, wherein the obtaining comprises inputting the current frame to the artificial intelligence learning model to read an area in which the difference in pixel value is less than or equal to the pre-set threshold value and skip the remaining area.

6. The method of claim 1, wherein the identifying the object comprises:
    obtaining a feature value on at least one object comprised in the current frame by inputting the current frame to the artificial intelligence learning model, and
    identifying an object based on a feature value within the area with movement of the obtained at least one feature value.

7. The method of claim 6, wherein the identifying the object comprises obtaining the feature value through a convolutional neural network (CNN) algorithm.

8. The method of claim 1, wherein the identifying comprises identifying an area with movement in a remaining frame excluding an initially input frame from among a plurality of frames being input.

9. An electronic device, comprising:
    an input interface; and
    a processor configured to:
        identify an area with movement in a current frame based on the current frame and a previous frame input through the input interface,
        obtain information on at least one object comprised in the current frame by inputting the current frame to an artificial intelligence learning model based on the area with movement, and
        identify an object comprised in the area with movement by using the obtained information on the at least one object.

10. The electronic device of claim 9, wherein the processor is configured to compare a pixel value of the previous frame and a pixel value of the current frame, and identify an area in which a difference in pixel value exceeds a pre-set threshold value as the area with movement.

11. The electronic device of claim 10, further comprising:
a storage,
wherein the processor is configured to store a coordinate value on an area identified as the area with movement in the storage.

12. The electronic device of claim 11, wherein the processor is configured to, based on a next frame being input through the input interface, obtain information on an object comprised in the next frame by inputting an area with movement in the next frame to the artificial intelligence learning model based on the stored coordinate value.

13. The electronic device of claim 10, wherein the processor is configured to input the current frame to the artificial intelligence learning model to read an area in which the difference in pixel value is less than or equal to the pre-set threshold value and skip a remaining area.

14. The electronic device of claim 9, wherein the processor is configured to:
obtain a feature value on at least one object comprised in the current frame by inputting the current frame to the artificial intelligence learning model, and
identify an object based on a feature value within the area with movement of the obtained at least one feature value.

15. The electronic device of claim 14, wherein the artificial intelligence learning model is configured to obtain the feature value through a convolutional neural network (CNN) algorithm.

* * * * *